United States Patent [19]

Iida

[11] Patent Number: 4,468,755
[45] Date of Patent: Aug. 28, 1984

[54] DOCUMENT SIZE CONVERSION CIRCUIT FOR A DOCUMENT FILING SYSTEM

[75] Inventor: Kazuhiko Iida, Yokohama, Japan

[73] Assignee: Tokyo Shibaura Denki Kabushiki Kaisha, Kawasaki, Japan

[21] Appl. No.: 316,911

[22] Filed: Oct. 30, 1981

[30] Foreign Application Priority Data

Oct. 31, 1980 [JP] Japan .................................. 55-153256
Oct. 31, 1980 [JP] Japan .................................. 55-153268

[51] Int. Cl.³ .......................... G06F 3/14; H04N 1/04
[52] U.S. Cl. ...................................... 364/900; 358/287
[58] Field of Search .................... 382/46, 47; 358/287; 364/200 MS File, 900 MS File

[56] References Cited

U.S. PATENT DOCUMENTS

| | | | |
|---|---|---|---|
| 3,753,240 | 11/1973 | Merwin | 364/200 |
| 3,949,375 | 4/1976 | Ciarlo | 364/200 |
| 3,976,982 | 11/1976 | Eiselen | 364/900 |
| 4,041,463 | 11/1977 | Slutzky et al. | 364/900 |
| 4,124,871 | 11/1978 | Morrin | 358/287 |
| 4,164,024 | 11/1979 | Gilbert | 364/900 |
| 4,267,573 | 5/1981 | Chaikin et al. | 382/46 |
| 4,302,776 | 11/1981 | Taylor et al. | 358/160 |
| 4,303,948 | 12/1981 | Arai et al. | 358/287 |

Primary Examiner—Jerry Smith
Assistant Examiner—Mark P. Watson
Attorney, Agent, or Firm—Cushman, Darby & Cushman

[57] ABSTRACT

Picture information stored in a memory device is read out and written into a page buffer and visually displayed on the screen of a CRT display under control of an interface unit for display, through a size conversion circuit.

4 Claims, 16 Drawing Figures

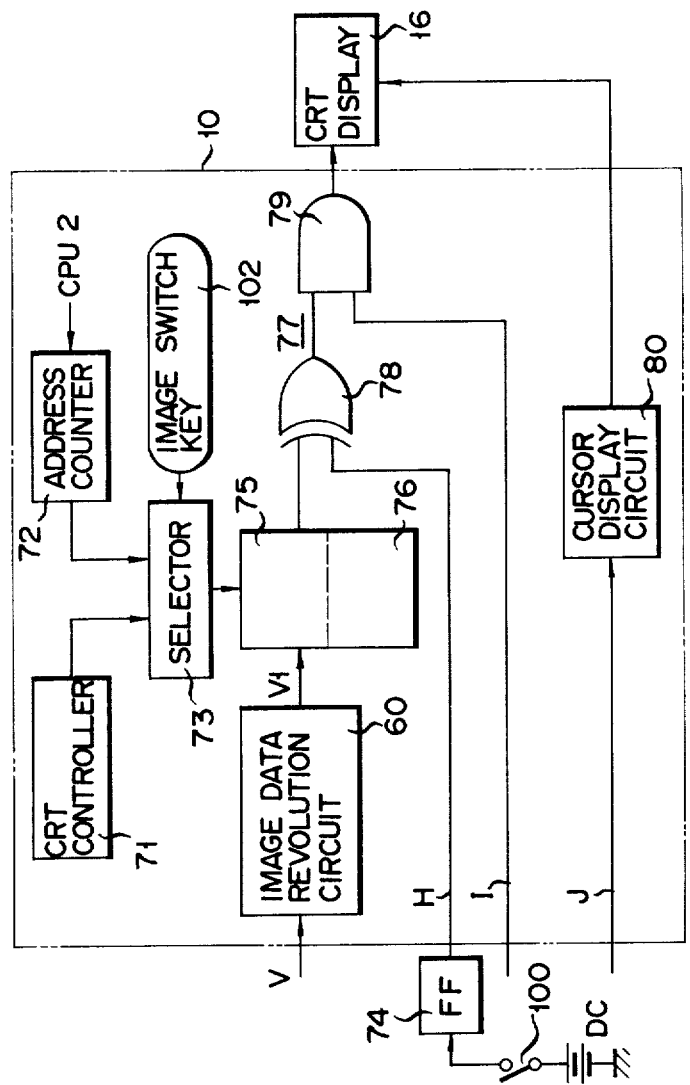
F I G. 9

FIG. 11

| DEGREE | 0 | 90 | 180 | 270 |
|---|---|---|---|---|
| COUNTERS TO BE X-DIRECTIONAL | COUNTER 64 COUNTER 65 | COUNTER 66 COUNTER 67 | COUNTER 64 COUNTER 65 | COUNTER 66 COUNTER 67 |
| COUNTERS TO BE Y-DIRECTIONAL | COUNTER 66 COUNTER 67 | COUNTER 64 COUNTER 65 | COUNTER 66 COUNTER 67 | COUNTER 64 COUNTER 65 |
| SELECTION ORDER OF EACH RAM BY DECODER 70 | a→d<br>e→h<br>i→l<br>m→p<br>(EVERY +1) | d→p<br>e→o<br>b→n<br>a→m<br>(EVERY +4) | p→m<br>l→i<br>h→e<br>d→a<br>(EVERY −1) | m→a<br>n→b<br>o→c<br>p→d<br>(EVERY −4) |
| OUTPUT OF GATE CIRCUIT 68 | 0→127 | 127→0 | 127→0 | 0→127 |
| OUTPUT OF GATE CIRCUIT 69 | 0→127 | 0→127 | 127→0 | 127→0 |

DOCUMENT SIZE CONVERSION CIRCUIT FOR A DOCUMENT FILING SYSTEM

BACKGROUND OF THE INVENTION

This invention relates to a document filing system for sequentially storing picture information on, for example, a document in a memory device and for retrieving and reading out the stored picture information stored. More specifically, this invention relates to a document size conversion circuit to be used in such a document filing system.

A document filing system, which has recently been developed, is adapted to scan picture information on a document by optical two-dimensional scanning using a laser for example. The scanned picture information is stored in a memory device in such a manner that it can be retrieved from among other various picture information stored in the memory device and read. Then it may be visually displayed on the screen of a CRT display device or printed paper using a printing device.

In the document filing system, the scanned picture information is first stored in a page buffer constituting a buffer memory and after one unit (one page) of picture information has been accumulated in the page buffer, it is stored in a memory device. Upon outputting the picture information stored in the memory device, the information is stored in the page buffer and then is supplied to the CRT display device or to the printing device. A variety of picture information is stored in the document filing system and a variety of paper sizes including B5 and B4 is used for the contents of the picture information. For a greater document size a page buffer of a corresponding capacity is necessary. However, a greater-capacity page buffer involves an increase in cost and requires more space. In order to display the picture information in the original state, a large CRT display device is required.

In order to cope with such problems it has been contemplated to divide such larger-sized picture information into smaller segments, without increasing the size of the page buffer and CRT display device, and to sequentially process the segments. This method requires much time in retrieving necessary information and outputting it. For this reason, demand has grown for a document filing system adapted to store one unit (one page) of picture information for display at the same time, without increasing the size of the buffer memory capacity and CRT display device, which can perform information retrieval very efficiently.

SUMMARY OF THE INVENTION

It is accordingly an object of this invention to provide a document filing system capable of either storing picture information at the same time, as one unit (for example, one page) of information into a buffer memory, irrespective of the size of a document, without increasing the capacity of the buffer memory, or displaying one unit of picture information at a time on a relatively small display device.

According to this invention there is a document filing system comprising means for scanning picture information on a document, means for storing the scanned picture information, means for reading out the stored picture information, a size conversion circuit for magnifying or reducing the read out picture information, and means for controlling the magnifying and reducing operation of the size conversion circuit.

BRIEF DESCRIPTION OF THE DRAWINGS

FIG. 9 is a block diagram of a display device according to the present invention;

FIG. 11 is a table for explaining the operation of the circuit shown in FIG. 10;

DETAILED DESCRIPTION OF THE PREFERRED EMBODIMENTS

Figure 1:
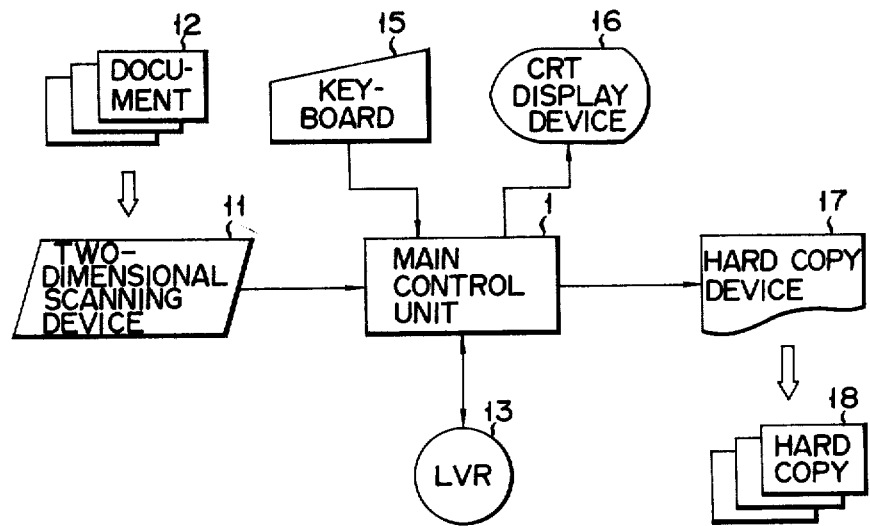
FIG. 1 is a block diagram of a document filing system with a display device assembled thereinto.
Figure 2:
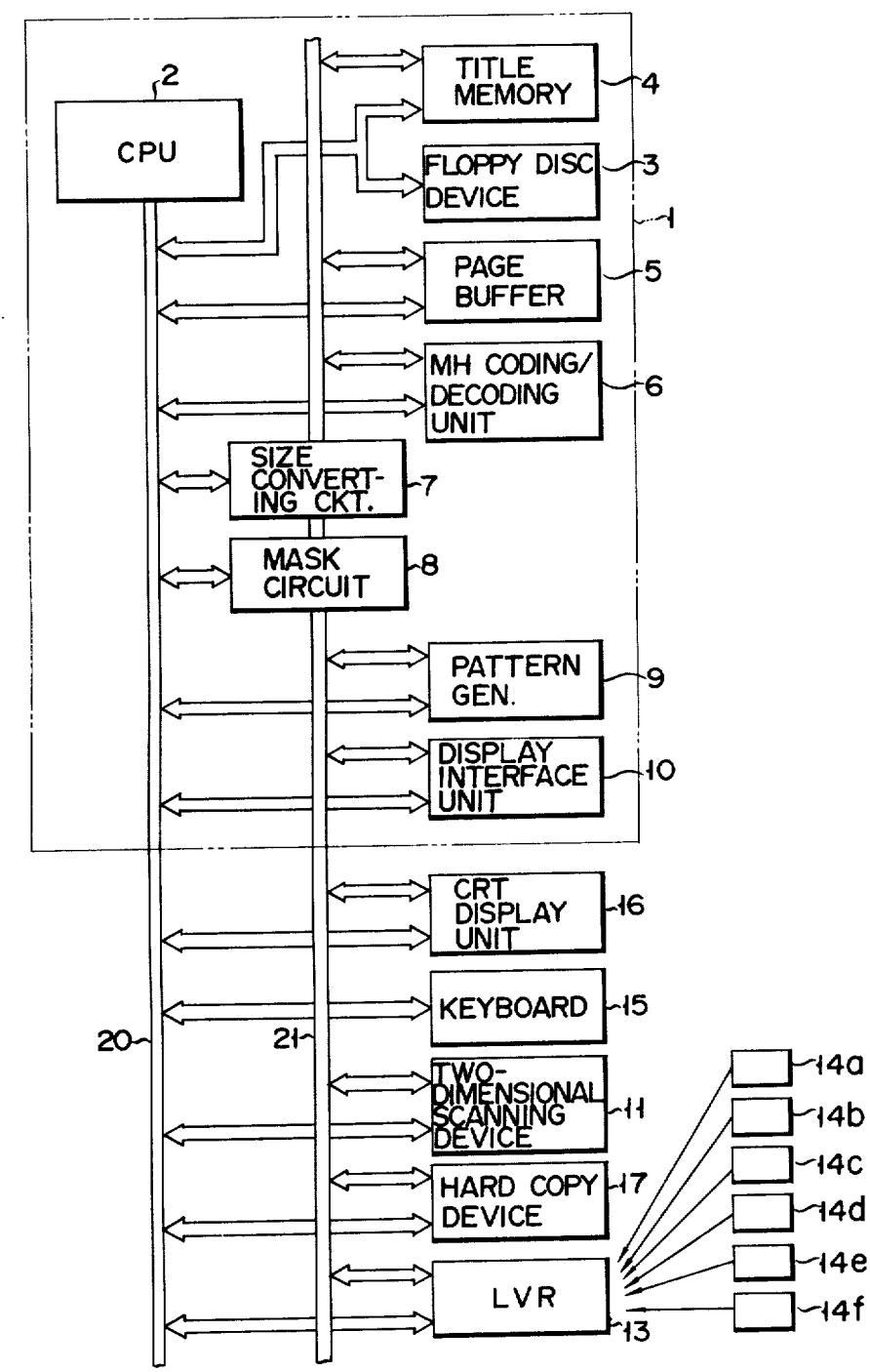
FIG. 2 is a block diagram illustrating detailed arrangement of the document filing system shown in FIG. 1.

In a document filing system shown in FIGS. 1 and 2, reference numeral 1 designates a main control unit. The main control unit 1 is comprised of a CPU 2 for executing various controls, a floppy disc unit 3 as an administration information memory unit for storing administration information for administrating various file sets (groups of magnetic tapes 14 to be described later) and various files (magnetic tape 14), a title memory 4 for temporarily storing title information read out from an LVR 13 to be described later, a buffer memory 5, for example, a page buffer, having a memory capacity of at least one unit (one page of a document), an MH coding/decoding unit 6 for compressing the picture information (reducing the redundancy of data) and expanding the compression data (returning the reduced redundancy data to the original data), a size converting circuit 7 for magnifying or reducing the picture information, a mask circuit 8 for electrically masking the picture information, a pattern generator 9 having the pattern information such as characters and/or symbols, and a display interface unit 10. Reference numeral 11 designates a scanning unit, e.g. a two-dimensional scanning device, which two-dimensionally scans a document 12 to produce electrical signals or picture information corresponding to the picture information on the document 12. Reference numeral 13 designates a magnetic tape device (referred to an LVR) with a large memory capacity for sequentially storing (recording) picture information supplied from the two-dimensional scanning device 11 through the main control unit 1, and index information prepared by said main control unit 1 into a storing medium or predetermined memory areas of the magnetic tape. Reference numeral 14 designates a plurality of endless magnetic tapes (cassette tape) provided for the kinds of the picture information, which are set in the LVR 13, when necessary. A keyboard 15 inputs a title of the picture information and various types of operation commands. An output unit 16, e.g. a display unit of the CRT type (referred to as a CRT display unit), displays the picture information supplied through the main control unit 1 from the two-scanning device 11, or, index information and picture information supplied from the LVR 13 through the main control unit 1. The output unit 16 cooperates with the display interface unit 10 in the main control unit 1 to form a picture information display unit. Another output unit 17 is a hard copy device, for example, and produces in the form of a hard copy 18 the picture information supplied from the two-dimensional scanning device 11 through the main control unit 1 or the index information and the picture information supplied from the LVR 13 through the main control unit 1.

The page buffer 5, the MH coding/decoding unit 6, the size converting circuit 7, the mask circuit 8, the pattern generator 9, the display interface unit 10, the two-dimensional scanning device 11, the LVR 13, the keyboard 15, the CRT display unit 16 and the hard copy device 17 are connected to a main bus line 20, which provides a main path for data, an address signal, an R/W control signal, and control signals for the memory and the I/O unit. The title memory 4, the page buffer 5, the MH coding/decoding unit 6, the size converting circuit 7, the mask circuit 8, the pattern generator 9, the display interface unit 10, the two-dimensional scanning device 11, the LVR 13, the CRT display unit 16, and the hard copy device 17 are connected to an image bus 30, through which the information is transferred to one another.

In the document filing system, the magnetic tape 14 is called a file, and file names are given in accordance with the kinds of picture information stored. A group of files, which belong to the same or similar kind, are called a file set. A file set name is also provided. The file set name is a generic term and the file name is a specific term. A number of picture information recording tracks and several index information recording tracks are formed on the magnetic tape 14 in the running direction. Recorded in the index information recording track are the administration information and various types of index information. The administration information includes a file name, a file set name, a private code, a title structure for determining a title condition set corresponding to the picture information and a title range. The administration information is previously recorded into the tape 14 by an operator. The index information, corresponding to the picture information, includes a title (up to 6 items) and the address information representing memory locations of the picture information. In this case, the address information includes document size information which is inputted together with the title when the operator inputs the picture information, or the document size information dependent on a document size detecting function of the two-dimensional scanning device 11.

A short description as to how the document filing system thus constructed operates, will now be given.

In a first step, the document 12 is set in the two-dimensional scanning device 11 and one of the magnetic tapes 14 (14a to 14f) is set in the LVR 13. The title corresponding to the picture information of the document 12 and a size of the document 12 are keyed in from the keyboard 15 and a memory operation command is keyed in, too. In response to this information, the LVR 13 operates to deliver the administration information and all of the index information from the index recording track of the magnetic tape 14, and that information read out is batched into the title memory 4. At this time, the CPU 2 judges whether or not the administration information in the title memory 4 corresponds to the various types of the administration information stored in the floppy disc device 5. When the judgment is unsatisfactory, the CPU 2 prohibits the image data from being stored thereinto. In other words, the CPU 2 judges that the set magnetic tape is not applicable for the document filing system. When the judgment is satisfactory, the CPU 2 judges whether the title inputted is coincident or not with the title of the various types of the index information in the title memory 4. When the judgment is unsatisfactory, it prohibits the storage of the picture information. The storage prohibition is made in order to prevent the same title from being stored in the magnetic tape set in the LVR 13. When the judgment is satisfactory, CPU 2 permits the storage of the picture information corresponding to picture information.

In this way, the two-dimensional scanning device 11 operates to read out the picture information on the document 12 and the read out picture information is stored into the page buffer 5 through the mask circuit 8 and the size converting circuit 7. When the picture information of one page of the document is stored in the page buffer 5, the picture information is read out from the page buffer 5 and are supplied to the MH coding/decoding unit 6 where the picture information is data-reduced by a well known modified Hoffman conversion process, and then stored in the page buffer 5 again. The image data thus data-reduced in the page buffer 5 is supplied through the size converting circuit 7 and the mask circuit 8 to the LVR 13. Then, the information is recorded following the picture information already stored in the picture information recording tracks on the cassette tape 14. At this time, the CPU 2 judges a memory location of the picture information to be recorded, prepares the index information by using the address information, the title information already inputted, and the document size, and finally adds the index information to the various types of the index information in the title memory 4. The administration information and the various types of the index information in the title memory 4 strike through the size converting circuit 7 and the mask circuit 8 for transmission to the LVR 13, and then recorded into the index information recording track of the cassette tape 14. In this case, various index information stored in the index information recording track are updated.

For retrieving and reading out desired picture information from the various picture information stored, the magnetic tape 14 storing the desired information is set in the LVR 13. Then, the retrieval/read out operation command is keyed in at the keyboard 15 to operate the LVR 13, so that the administration and various types of index information are read out from the index information recording track of the magnetic tape 14. The read out information strikes through the mask circuit 8 and the size converting circuit 7 for transmission to the title memory 4 where those pieces of information are stored in a batch manner. At this time, when a sort command is keyed in from the keyboard 15, the various index information in the title memory 4 strike through the size converting circuit 7 and the mask circuit 8 and are displayed in the CRT display unit 16. In this case, sequence numbers are given to the index information displayed. Then, the operator searches the desired picture information from the various index information displayed and keys in a sequence number attached to the index picture information, through the keyboard 15. Then, the index information of the sequence number is selected and the desired picture information is read out from the magnetic tape 14 of the LVR 13 on the basis of the index information. The picture information read out passes through the mask circuit 8 and the size converting circuit 7 to be stored in the page buffer 5. When one page picture information is stored in the page buffer 5, the picture information is read out from the page buffer 5 and is supplied to the MH coding/decoding circuit 6. In the circuit 6, the information is data-expanded by the modified Hoffmann decoding process, and then is stored in the page buffer 5. At this time, if the record command has been keyed in by the keyboard 15, the picture information in the page buffer 5 is supplied through the size converting circuit 7 and the mask circuit 8 to the hard copy device 17 where the picture information is reproduced on a recording sheet. If a display command has been keyed in from the keyboard 15, the picture information in the page buffer 5 is supplied through the size converting circuit 7, the mask circuit 8 and the display interface unit 10 to the CRT display unit 16 where the picture information is displayed.

The explanation to follow is the elaboration of the MH coding/decoding circuit 6, the size converting circuit 7, the mask circuit 8 and the display interface circuit 10.

Figure 3:
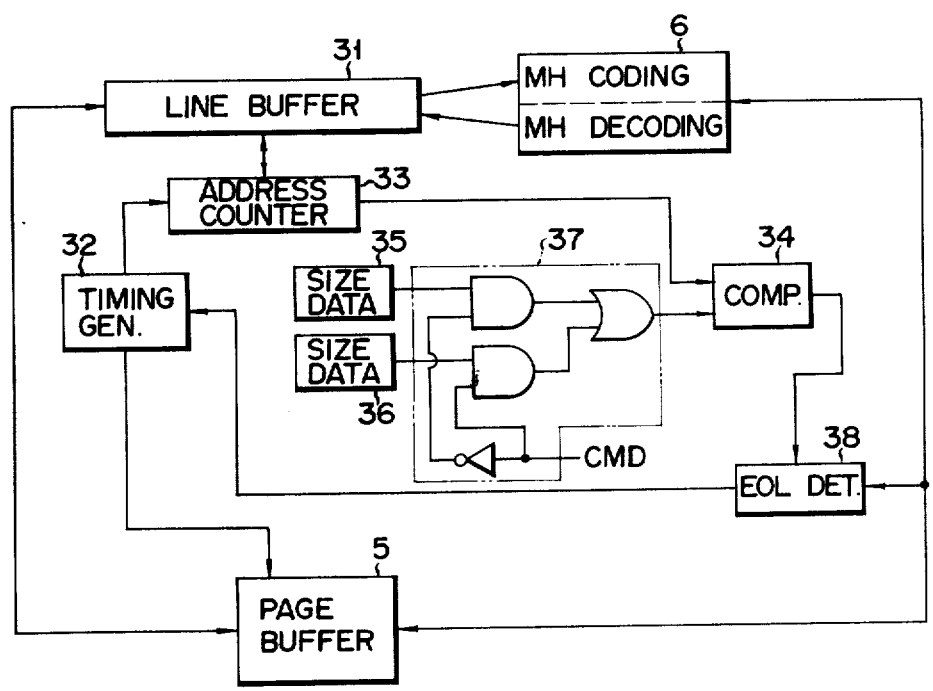
FIG. 3 is a block diagram of a peripheral circuit including a compression/expansion circuit of data lengths.

(1) MH coding/decoding circuit 6: The circuit 6 has the following functions under control of the CPU 2, in addition to the data compression (coding) and expansion (decoding) as its main function. It is assumed that the memory capacity of the page buffer 5 corresponds to the picture information of a document of A4 size. In storing the picture information, if the document 12 has a B5 size smaller than the A4 size, some memory areas of the page buffer 5 store no picture information. Therefore, if the picture information is compressed over all the memory areas of the page buffer 5, the unnecessary information is also stored in the LVR 13. It is for this reason that the CPU 2 controls the MH coding/decoding operation of the circuit 6 in accordance with the document size information, and reduces only the picture information corresponding to the B5 size stored in the page buffer 5. FIG. 3 shows a detailed peripheral circuit of the page buffer 5 and the MH coding/decoding circuit 6. A line buffer 31 temporarily stores the picture information of one line read out from the page buffer 5 or the picture information of one line to be stored in the page buffer 5. A timing signal generator 32 generates a clock signal D corresponding to one picture element of the picture information and a line clock signal E corresponding to one line. An address counter 33 designates an effective area in the line buffer 31 corresponding to the size of the document 12. Holders 35 and 36 hold the document size information of the sizes A4 and B5, for example. A selector circuit 37 selects output signals from the holders 35 and 36 in accordance with the size of the document 12 on the basis of a command signal CMD issued from the CPU 2. Specifically, when the CMD is "0", an AND gate connected to the holder 35 is enabled through an inverter to fetch the size data of the A4 size. A comparator 34 compares the output from the address counter 33 with that of the selector circuit 37. A end-of-line (EOL) detector circuit 38 controls the timing generating circuit 32 in accordance with the comparing result of the comparator 34.

(2) Size converting circuit 7: The circuit 7 has a magnifying mode, a reduction mode, and a pass-through mode, and operates as the following under control of the CPU 2.

(a) In storing the picture information; the circuit 7 reduces or passes-through of the picture information supplied from the two-dimensional scanning device 11 to the page buffer 5. For example, if the memory capacity of the page buffer 5 corresponds to the picture information of an A4 document, it is impossible to store the picture information of a B4 size document. It is for this reason that the CPU 2 drives the size converting circuit 7 to reduce the picture information at a given reduction rate when the document size information inputted from the two-dimensional scanning device 11 or the keyboard 15 is larger than the memory capacity of the page buffer 5. Therefore, there is no need to use the page buffer with a large memory capacity, thereby decreasing the manufacturing cost and the space occupied in the chip. When the document size is equal to or smaller than the memory capacity of the page buffer, for example, A4 or B5, the size converting circuit 7 is driven by the CPU 2 to pass-through (the reduction rate is "0" and the expansion or magnification rate is "0") the information.

(b) In storing and reading out the picture information; the circuit 7 passes through the picture information supplied from the page buffer 5 to the LVR 13 and the picture information from the LVR 13 to the page buffer 5.

(c) In recording the read out picture information by the hard copy device 17; the circuit 7 magnifies, reduces or passes through the picture information from the page buffer 5 to the hard copy device 17. Specifically, the CPU 2 drives the circuit 7 to magnify at a given magnifying rate or to pass-through the picture information in accordance with the document size information contained in the index information selected when the picture information is read out. The magnifying operation in this case is made for returning the picture information reduced in item (a) to the original size of the picture information. The CPU 2 activates the size magnification/reduction circuit 7 to reduce at a given reducing rate or to pass-through the picture information in accordance with the size of the recording paper in the hard copying device 17. In this way, the read out picture information of one unit may reliably be recorded regardless of the size of the recording paper in the hard copy device 17.

(d) In displaying the read out picture information by the CRT display unit 16; the circuit 7 reduces or passes through the picture information from the page buffer 5 to the display interface 10. The CPU 2 actuates the size converting circuit 7 to reduce at a given reduction rate or pass through the picture information on the basis of the display size ability of the CRT display unit 16 previously stored. Therefore, there is no need of using a bulky and high performance CRT display unit and hence it is possible to reduce its manufacturing cost. In this case, the operator may cause the size connecting circuit to be driven, to provide an easy-to-see display.

(e) Others; the size converting circuit 7 operates in the pass-through mode when the pattern information read out from the pattern generator 9 is supplied to the page buffer 5 and is added to the picture information in the page buffer 5.

Figure 4:
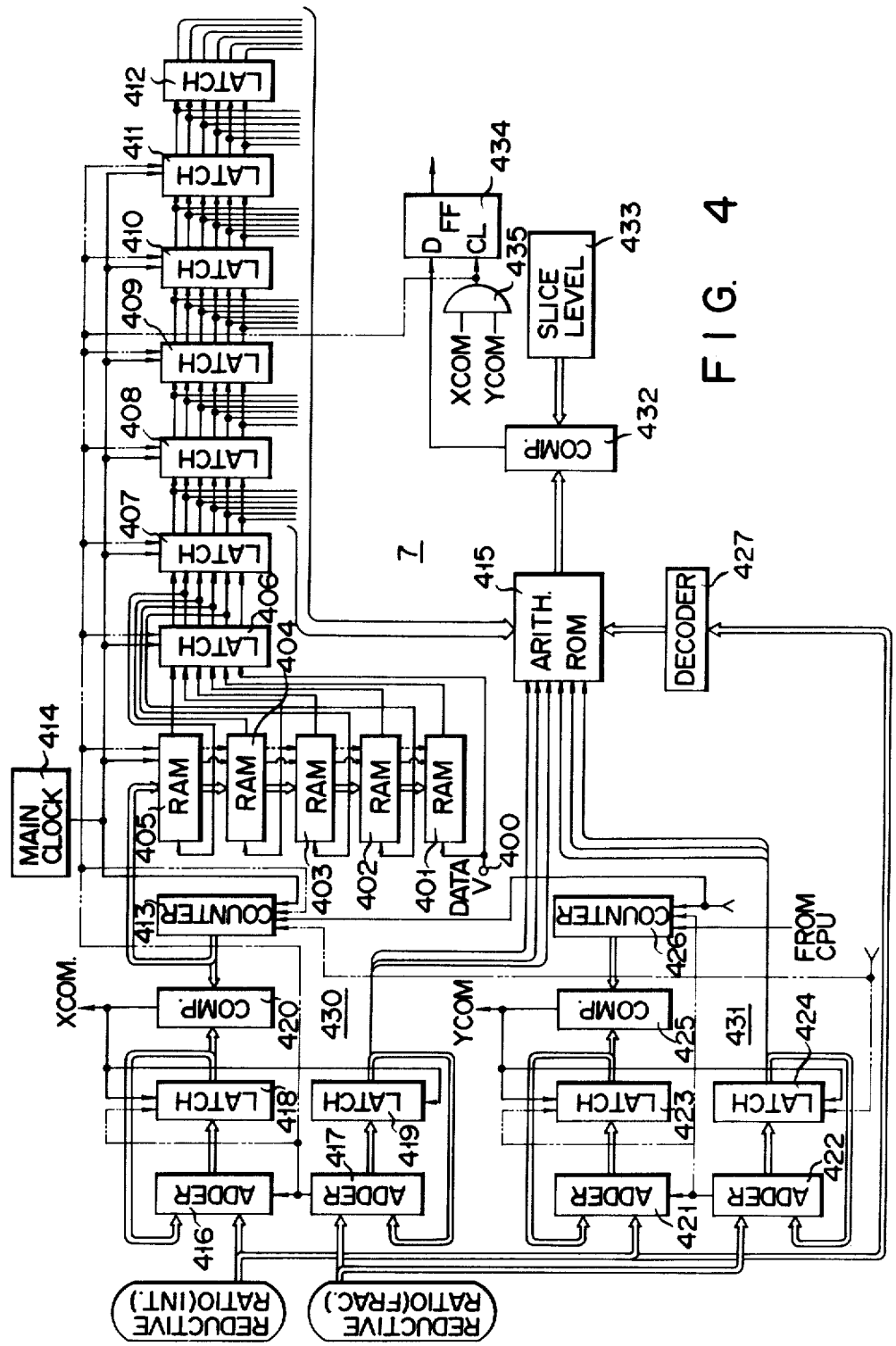
FIG. 4 is a block diagram of a size converting circuit.

FIG. 4 illustrates the size conversion circuit 7. In this figure, picture information V sent forth from the two-dimensional scanning device 11 obtained for each scanning line therein or picture information of one line read out of the page buffer 5 is supplied to a data input terminal 400. The picture information of one line is assumed to be constituted of 2,048 bits in this case. The picture information supplied to the terminal 400 is supplied to a RAM 401 and a latch 406 of six-bits. RAM 401 is a 2K×1 bit memory and the address thereof is designated by the output of a counter 413. In the circuit 7, five RAMs 401 to 405 and seven latches 406 to 412 are provided. These RAMS 401 to 405 and latches 406 to 412 are all operated by a clock signal supplied from a main clock generator 414 through a signal path shown by a solid line or a signal line shown by a two-dot line. The signal path shown by the solid line is used when the circuit of FIG. 4 acts as a size reduction circuit and the signal path shown by the two-dot line is for a size expansion circuit.

Thus, under the address control of the counter 413, first one line picture information of 2,048 bits is stored in the first RAM 401. Then, when a first bit of second line picture information is supplied to the RAM 401 the first bit of the first line picture information having been stored in the RAM 401 is read out therefrom and latched at the latch 406, while the first bit of the second line is stored in the first memory location of RAM 401. Then, the second bit of the second line is stored in the RAM 401 and the second bit of the first line is read out and latched in the latch 406. In the same time the first bit of the first line latched at the latch 406 is sent forth to the second RAM 402 and stored therein. In this way, when the last (2,048th) bit of second line is stored in RAM 401, the first one line picture information data of 2,048 bits is shifted to second RAM 402. Thus, each one line picture information of 2,048 bits is sequentially shifted in the RAMs 401 to 405. At last, first to fifth line picture information is respectively stored in the RAMs 405 to 401 and first bits of each first to fifth line picture information are latched at the latch 406 to be sent forth to the latch 407 at the same time together with a first bit of sixth line picture information supplied to the terminal 400.

Figure 5:
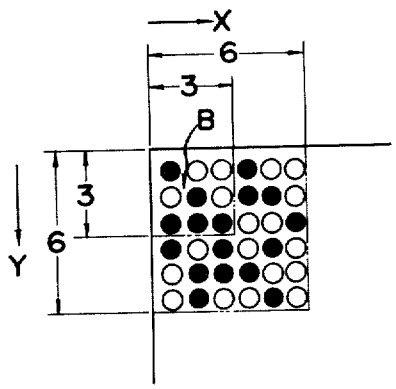

When the second bit of the sixth line is supplied to the terminal 400, each first bit of first to sixth lines latched at the latch 407 is sent forth to the next latch 408 and each second bit of first to sixth lines is latched at latch 407. In the similar manner, when seventh bit of sixth line picture information is supplied to the terminal 400, the first bit of each first to sixth line is latched at latch 412, second bit of the same is latched at latch 411, third bit at latch 410, fourth bit at latch 409, fifth bit at latch 408, and sixth bit at latch 407. Thus, if the respective bits latched in the latches 407 to 412 are rearranged in a matrix array, the original picture is reproduced as the dot picture as shown in FIG. 5 wherein the black dots represent "1" bit and white dots represent "0" bit. Thus, a local picture information of 6 bits (X direction)×6 lines (Y direction) is supplied to an arithmetic ROM 415 from the latches 407 to 412.

Two adders 416, 417, two latches 418, 419, a comparator 420 and the counter 413 constitute a distance calculating circuit 430 in X direction, and, two adders 421, 422, two latches 423, 424, a comparator 425 and a counter 426 constitute a distance calculating circuit 431 in Y direction. These distance calculating circuits 430 and 431 are used for calculating a picture dot position of a size-converted picture in both X, Y directions. The size conversion (expansion or reduction) rate setting data in X, Y directions supplied from CPU 2 is supplied to adders 416, 417, 421 and 422. In FIG. 4, a reduction ratio data is shown as an example. The integer part of the reduction rate is supplied to adders 416, 421 and a decoder 427 and the fraction part is supplied to adders 417 and 422. The outputs of adders 416, 417, 421 and 422 are supplied to the latches 418, 419, 423 and 424, respectively. The outputs of the latches 418 and 423 are respectively supplied to one input side of the comparator 420 and 425 and also fedback to input side of the adders 416 and 421, respectively. The other sides of the comparators 420 and 425 have inputs supplied from the counters 413 and 426. The outputs of latches 419 and 423 are fedback to the input sides of the adders 417 and 421, respectively.

Three bits in fraction part output data of the circuit 430 and three bits in fraction part output data of the circuit 431 are took out from the respective latches 419 and 424 and are supplied to the arithmetic ROM 415 as an address designating signal. The output data read out of the arithmetic ROM 415 is supplied to one input side of a comparator 432 which has the other input side supplied with a slice level data obtained from a slice level data generator 433. The coincidence signal of the comparator 432 is supplied to a D input terminal of a flip-flop 434 having a clock terminal CL supplied with an output of an AND gate 435. The AND gate 435 has one input supplied with a coincidence output XCOM of the comparator 420 while the other input has an input YCOM obtained from the comparator 425.

The operation of the size conversion circuit 7 shown in FIG. 4 will be described in detail by referring to FIG. 6. It is assumed that the reduction ratio designated from the CPU 2 is 1/4.5. Thus, the integer part of the reduction ratio is 4 while the fraction part thereof is 0.5. These numeral data in digital form is set in each of the adders 416, 417 and 421, 422.

Figure 6:
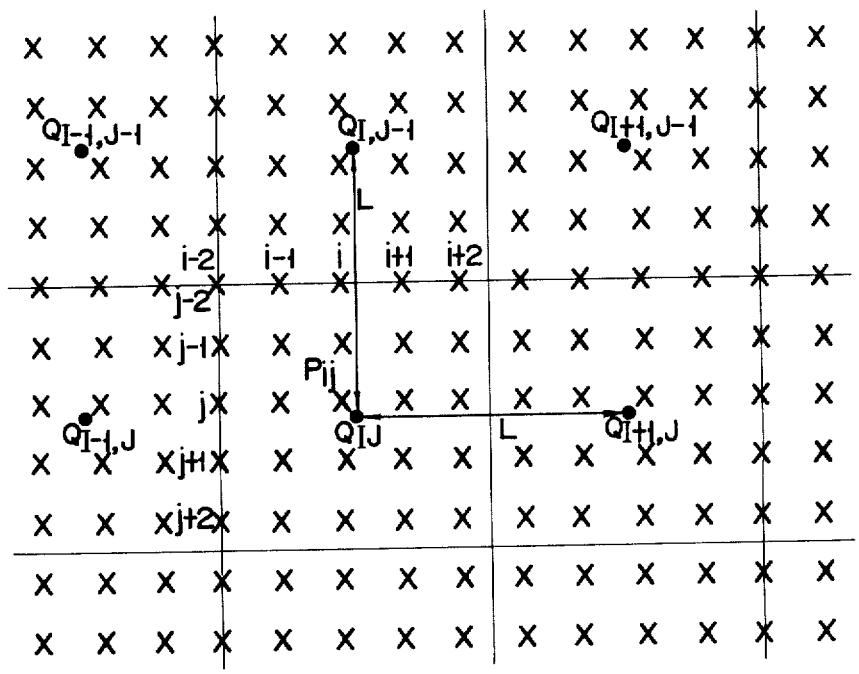
FIGS. 5 and 6 are schematic diagrams useful in explaining the operation of the size converting circuit shown in FIG. 4.

In FIG. 6, picture dot positions of the original picture are designated by the symbol "×" while the picture dot positions of the size-converted picture are designated by the black dot. The picture dot at the position (i,j) on the original picture is defined as $\{P_{i,j}\}$.

$$\{P_{i,j}\} = \begin{cases} 1 \ldots \text{black dot} \\ 0 \ldots \text{white dot} \end{cases}$$

The picture dot at the position (I,J) on the size-reduced picture is defined as $$\{Q_{I,J}\}.$$

The distance between two adjacent picture dots of the original picture is defined as 1. Then the distance between two adjacent size-reduced dots on the original picture equals with the reduction ratio Rr.

$$L = Rr.$$

In this case the constant L is set as 4.5. When L×L area having a center position $Q_{I,J}$ is designated as S, the average gray level $\phi_{I,J}$ of S is calculated based upon the fact whether the picture dot $\{P_{i,j}\}$ belonging to the area S exists or not. If the distance between the respective original position $P_{i,j}$ and the converted position $P_{I,J}$ is defined as $r_{i,j}$, the weighting factor $a_{i,j}$ for calculating the average gray level $\phi_{I,J}$ is so determined that the factor $a_{i,j}$ is inversely proportional to the distance $r_{i,j}$. Thus, by setting the factor $a_{i,j}$ as 1 at the position of $Q_{I,J}$, and as 0.5 at the position away from by L/2, the factor $a_{i,j}$ is represented as follows.

$$a_{i,j} = 1 - \frac{0.5}{L/2} r_{i,j} = 1 - \frac{r_{i,j}}{L}$$

Therefore, the average gray level $\phi_{I,J}$ $$\phi_{I,J} = \frac{\Sigma a_{i,j} \cdot P_{i,j}}{\Sigma a_{i,j}} \quad (P_{i,j} \leftarrow S)$$

is obtained. Then, the converted picture dot $$Q_{I,J} = \begin{cases} 1 \ldots \phi_{I,J} > \theta \\ 0 \ldots \phi_{I,J} < \theta \end{cases}$$

is obtained by using a predetermined slice level $\theta$.

Now the operation of the circuit of FIG. 4 will be described. The integer part 4 of the reductive ratio supplied from CPU 2 is supplied to the latch 418 through adder 416. Thus, when the contents of counter 413 becomes 4, a coincidence signal XCOM is delivered from the comparator 420 and is supplied to latches 418 and 419 and AND gate 435. On the other hand, the fraction part 0.5 is latched at latch 419 through adder 417. Thus, when the signal XCOM is supplied to the latches 418 and 419, an addition of 0.5+0.5=1 is calculated at the adder 417 and a carry signal of 1 is supplied to the adder 416. Accordingly, an addition of 4+4+1=9 is done at the adder 416 and a new data "9" is set at the latch 418. In this time, when the contents of the counter 413 becomes "9", an output XCOM is obtained at the output of the comparator 420. Then 9+4=13 is set at the latch 418 and an output XCOM is obtained when the counter 413 reaches at 13. At this time, an addition of 13+4+1 is done at the adder 416 and a new data "18" is set at the latch 418. Thus, each time the contents of the counter 413 becomes "4, 9, 13, 18, 22, 27, . . . " an output XCOM is obtained at the comparator 420. This output XCOM is supplied to one input of the AND gate 435.

The same operation as in the circuit 430 is performed in the circuit 431 and an output YCOM is supplied to the other input of the AND gate 435 from the comparator 425 every time the contents of the counter 426 reach at "4, 9, 13, 18, 22, 27, . . . ". When both the inputs XCOM and YCOM are supplied to the AND gate 435, an output is supplied to the clock terminal of the flip-flop 434. At this time, if the output level $\phi_{I,J}$ coincide with an output level of the slice level generator 433, an output is supplied from the comparator 432 to the D terminal of the flip-flop 434, and an output $Q_{I,J}$ of black dot as shown in FIG. 6 is obtained from the flip-flop 434.

In the magnifying operation, magnifying ratio of, for example, 0.5 is supplied to the adders 416, 417, 421, 422 from the CPU 2. In this case, the number of $Q_{I,J}$ is twice the number of $P_{i,j}$ and the original picture size is magnified by two times.

(3) Mask circuit: The circuit masks the unnecessary portion of the picture information and operates the following operation under control of the CPU 2.

(a) In storing the picture information; the circuit masks the picture information read out by the two-dimensional scanning device 11 and supplied to the page buffer 5 in accordance with the document size information inputted. Since the two-dimensional scanning device 11 scans a given scanning area irrespective of the size of the document 12, only the area corresponding to the size of the document 12 is treated as the effective picture information. Therefore, the unnecessary picture information such as scars or dust are negligible. Stored into the page buffer 5 are new picture information and the apparent picture information around the former (the portion masked) as well. Accordingly, even if the old picture information is stored in the page buffer 5, the old information is never added to the new picture information. Accordingly, there is no need for control for previously clearing the page buffer 5.

(b) In reading out the picture information; the mask circuit masks the picture information read out from the page buffer 5 in accordance with the document size information contained in the index information selected and supplies it to the hard copy device 17 or the interface 10. In this case, in the hard copy device 17, no unnecessary toner is attached to a photosensitive drum (not shown), thereby to lessen soil on the drum.

Figure 7:
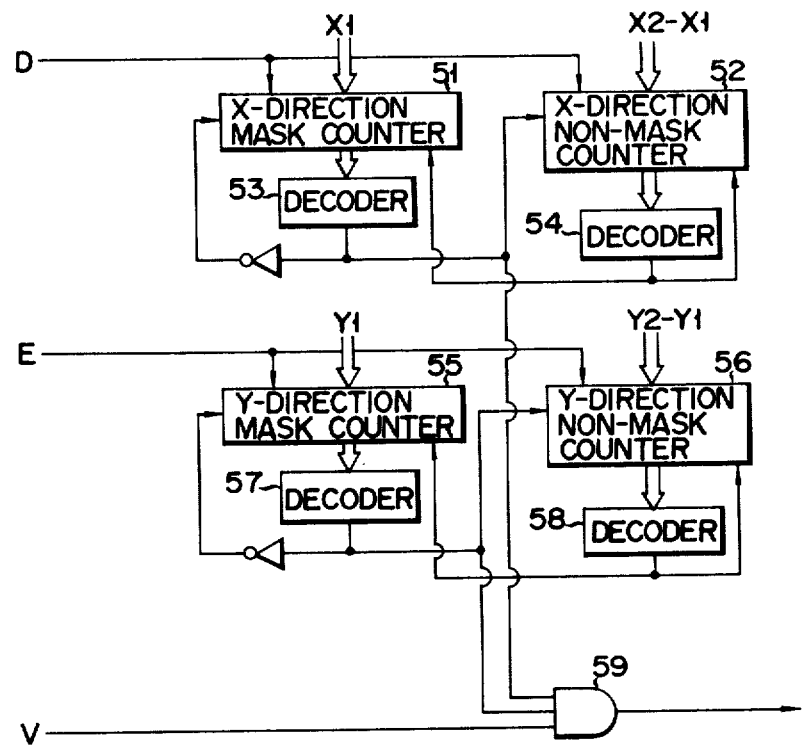
FIG. 7 is a block diagram illustrating an arrangement of a mask circuit.
Figure 8:
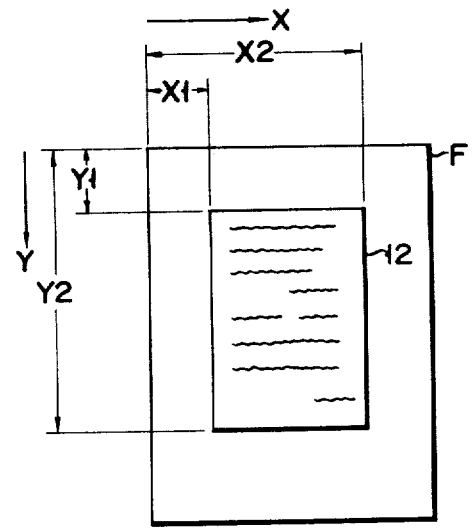
FIG. 8 is a schematic diagram illustrating a relationship between a scanning area and a document size of a document read out device.

FIG. 7 shows the mask circuit 8. Down counters 51 and 52 are an X direction nonmask counter and an X direction nonmask counter, as first counters. Those counters count the clock signal D corresponding to each bit (serving as a picture element of the picture information) in a one-dimensional direction of the two-dimensional scanning device 11 or the clock signal D corresponding to one picture element of the picture information read out from the page buffer 5 every scanning line (corresponding to the line scanning of the two-dimensional scanning device 11). In FIG. 8, F designates a scanning area of the two-dimensional scanning device 11 and the document 12 is set in the scanning area F. In this case, the first mask area in the X direction is a distance X1 and a nonmask area (an effective area) is a distance X2−X1. The first mask area in the Y direction is a distance Y1 and a nonmask area (an effective area) is a distance Y2−Y1. A value of X1 is preset in the counter 51 and a value of X2−X1 is preset in the counter 52. Decoders 53 and 55 produce logical "1" signals when the contents of the counters 51 and 52 are logical "0". Down-counters 55 and 56 are a Y direction counter and a Y direction nonmask counter as second counters, respectively. Those counters count a line clock signal E every line scanning in the Y direction of the two-dimensional scanning device 11 and another line clock signal E every line scanning for the picture information read out from the page buffer 5 every line. Accordingly, a value Y1 is preset in the counter 55 and a value of Y1−Y2 is preset in the counter 56. Decoders 57 and 58 produce logical "1" signals when the contents of the counters 55 and 56 are "0". A gate circuit 59 makes a mask or nonmask of a picture information signal V supplied from the two-dimensional scanning device 11 and another picture information signal V supplied from the page buffer 5. Thus, in the X direction, the counter 51 counts down and when the counts thereof reaches "0", the counter 52 starts to count down. When the content of the counter 52 becomes "0", the counters 51 and 52 are preset again, and ready for the next line scanning. In the Y direction, the counter 55 counts down, and when the content thereof becomes "0", the counter 56 starts to count down. When the content of the counter 56 is "0", the counters 55 and 56 are preset again and ready for the next line scanning.

(4) Display interface: The circuit 10, as shown in FIG. 9, is comprised of a picture information rotating circuit 60 for rotating the picture information every 90°.

Figure 13:
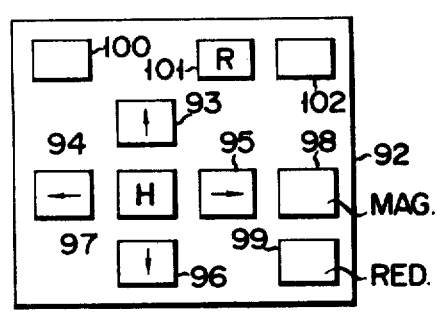
FIG. 13 is a plan view of a picture operating section on a keyboard.

The picture information V delivered from the rotating circuit 60 is supplied to a refresh memory unit having a first refresh memory 75 and a second refresh memory 76. A start address of the refresh memory unit is selected by the selector 73 which is driven by an output of an image switch key 102. The image switch key 102 is provided of an operation keyboard as shown in FIG. 13. The selector 73 receives outputs of a CRT controller 71 and an address counter 72 supplied with an address designation signal from CPU 2.

The picture information V read out from the page buffer 5 and reduced by the size converting circuit 7 is rotated by a given angle, if necessary, by the picture information rotating circuit 60, and are stored into the first refresh memory 75. The picture information read out from the first refresh memory 75 are supplied through the phase determining circuit 77 to the CRT display unit 16 where the information is displayed. At this time, when a cursor of a predetermined size is set for the picture information of the CRT display device 16, or the picture information in the first refresh memory 75, by the cursor display device 80, the picture information of the area corresponding to the cursor is read out from the page buffer 5, and the read out information is properly reduced by the size converting circuit 7 to be stored in the second refresh memory 76 under the address designation of the CPU 2 through the address counter 72. Then, when the operator inputs a partial display command through the image switch key 102, the partial picture information in the second refresh memory 76 is read out and displayed on the CRT display device 16. The phase determining circuit 77 is comprised of an exclusive OR circuit 78 and an AND circuit 79. The exclusive OR circuit 78 is supplied with the picture information read out from either the first refresh memory 75 or the second refresh memory 76 and a phase signal H keyed in by an inversion key 100 on the keyboard 15 shown in FIG. 13 as well via a flip-flop 74. The phase signal H is a signal of logic "1" or "0" from the flip-flop circuit FF. And when the operator selects one desirable logic through the key operation, the color (while, black) of the picture display over the entire display screen of the CRT display device 16 can be freely inverted. Further, the AND circuit 79 is supplied with the picture information signal from the exclusive OR circuit 78 and an unblanking signal I from the CRT controller 71. In other words, an effective display area of the picture information for the CRT display device 16 can be set by the unblanking signal I.

Figure 10:
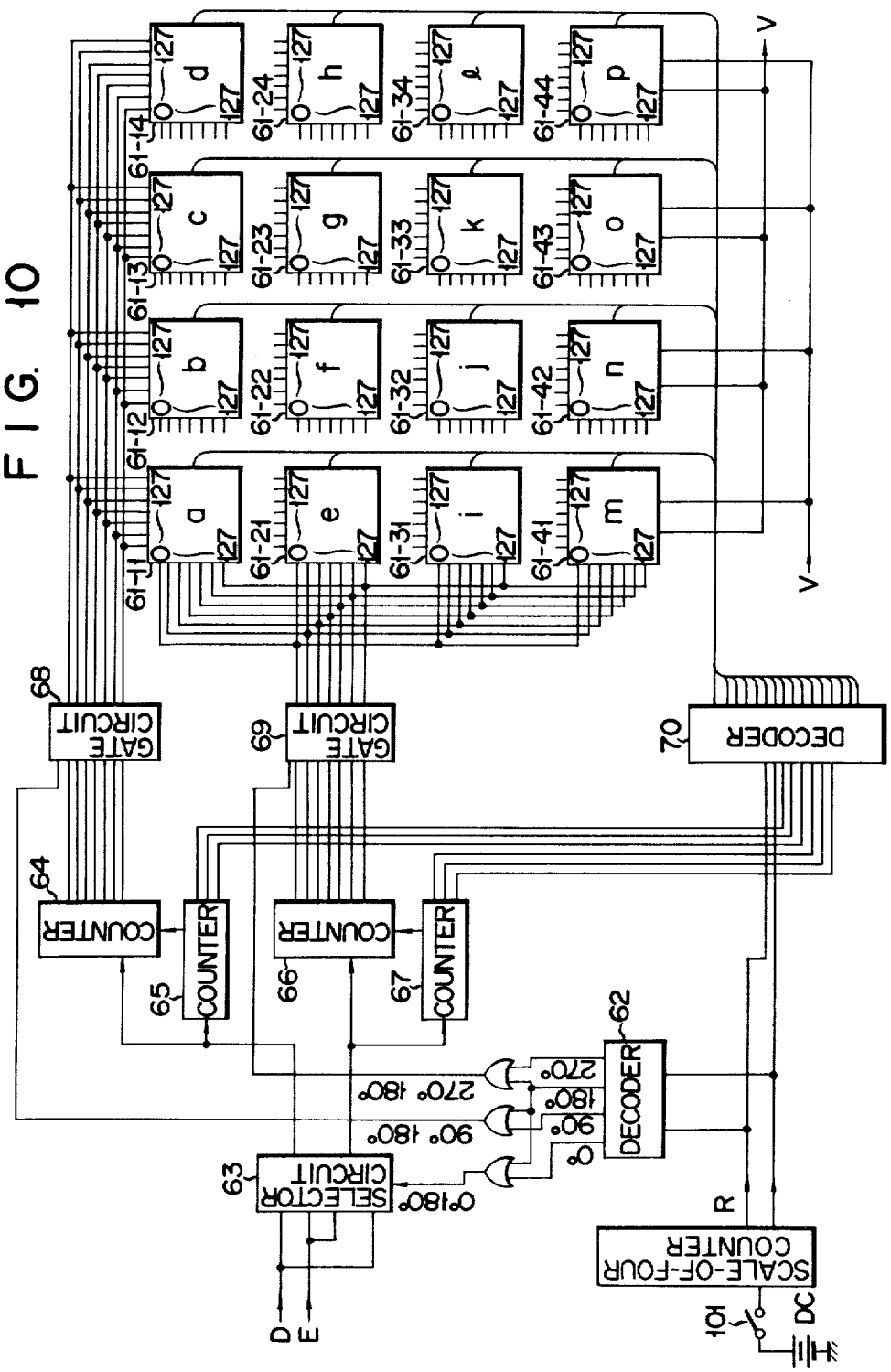
FIG. 10 is a block diagram of a picture rotating circuit used in the display device in FIG. 9.

FIG. 10 shows a picture information rotating circuit. In FIG. 10, reference numerals 61-11, 61-12, ..., 61-44 designate memory chips each of 1 bit output (referred to RAM), of which the address of 128×128=16,384 bits can be randomly accessed, and those chips are arranged in a matrix fashion corresponding to the X and Y directions of the picture information. A decoder 62 which produces four types (0°, 90°, 180° and 270°) of rotation commands in response to an angle designating signal R of 2 bits from a scale-of-four counter 60 stepped through the operation of a rotation key 101; for example, "0,0" for 0°, "0,1" for 90°, "1,0" for 180°, and "1,1" for 270°. Reference numeral 63 is a selector circuit for producing a clock signal D corresponding to each bit (picture element) every line of the picture information and a line clock signal E corresponding to each line of the picture information for transmission to the output line according to the rotating commands of 0° and 180° from the decoder 62. Numeral 64 designates a scale-of-128 counter; 65 a scale-of-four counter; 66 a scale-of-128 counter; 67 a scale-of-four counter. Reference numeral 68 is a gate circuit which is enabled when receiving the rotating commands of 90° and 180°. With this, the addresses of the RAMs 61-11 to 61-44 in the X direction are sequentially designated. A gate circuit 69 is enabled by rotating commands of 270° and 180°, to sequentially designate addresses in the X and Y directions of the RAMs 61-11 to 61-44. Reference numeral 70 is a decoder for outputting a chip select signal in response to outputs of the counters 65 and 67 and the angle designating signal R to select the RAMs 61-11 to 61-44. FIG. 11 is useful in explaining how the circuit shown in FIG. 10 practically operates.

Thus, the picture information can be displayed rotated at a desirable rotating angle by inputting the rotating command corresponding to the predetermined angle from the keyboard 15.

Figure 12:
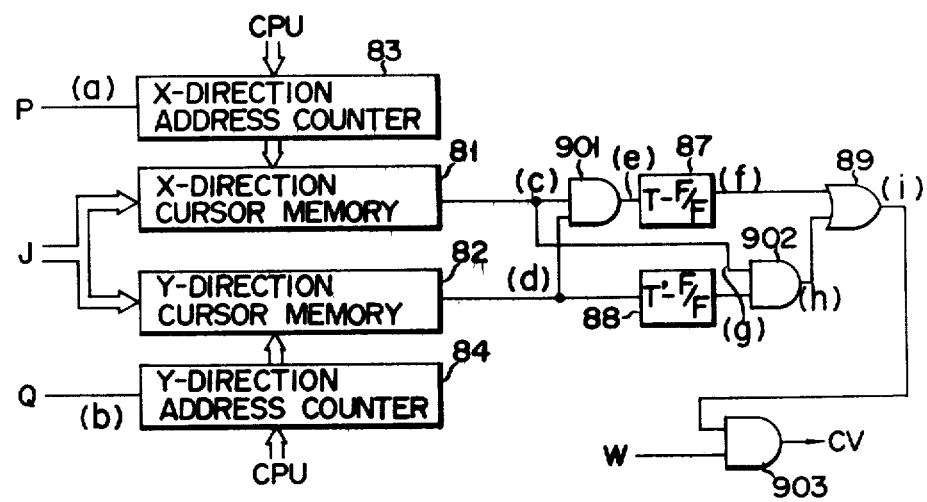
FIG. 12 is a block diagram of a cursor display circuit used in the circuit in FIG. 9.
Figure 14:
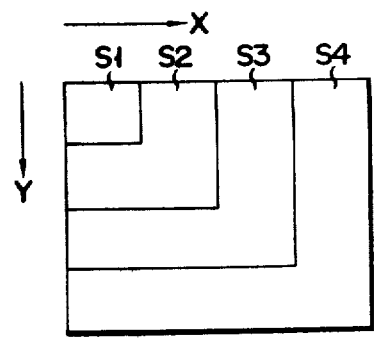
FIG. 14 is a view illustrating sizes of a cursor.
Figure 15A:
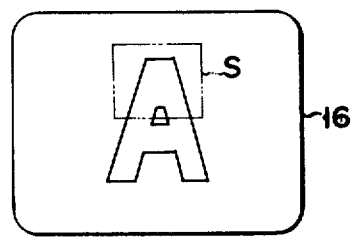
FIGS. 15A and 15B are views illustrating cursor display states.
Figure 15B:
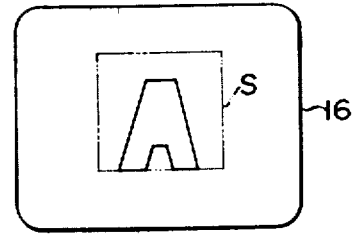
Figure 16:
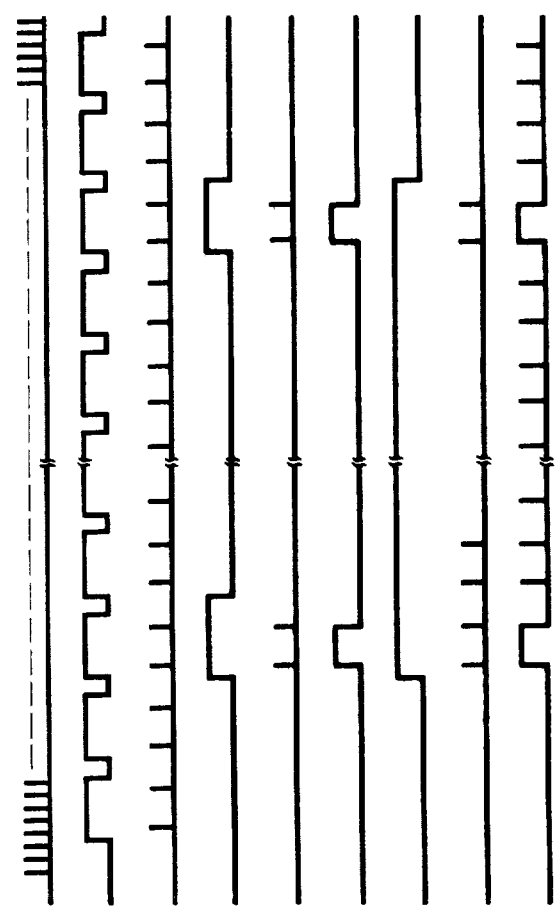
FIG. 16 is a time chart useful in explaining the operation of the circuit shown in FIG. 12.

FIG. 12 shows a cursor display device 80. In FIG. 12, reference numeral 81 designates an X direction cursor memory for holding a positional information on both sides of the cursor in response to a write code information J from the CPU 2. Reference numeral 81 is a Y direction cursor memory for holding both the top and bottom positional information of the cursor in response to the write code information J from the CPU 2. Numeral 83 indicates an X direction address counter which counts a cursor clock signal P supplied from the first refresh memory 75. A Y direction address counter 84 counts a horizontal sync signal Q supplied from the first refresh memory 75. Numeral 85 represents a decoder which produces a logic "1" signal when the contents of the counter 83 are coincident with the positional information signals of the both sides. Reference numeral 86 designates a decoder for producing a logic "1" signal when the contents of the counter 84 are coincident with the positional information of the top and bottom sides. Reference numerals 87 and 88 are T-flip-flop; 89 an OR circuit; 901, 902 and 903 AND circuits. Character W indicates a blink signal; CV a cursor video signal. In FIG. 13, reference numeral 92 designates an operation panel provided on the keyboard 15. 93, 94, 95 and 96 are shift keys, and when those keys are pushed, shift pulses are produced during the pushed period. Reference numeral 97 indicates a shift key for shifting the cursor to the left upper corner of the display screen; 98 a magnifying key for magnifying the cursor and a pulse is generated every time the key is pushed; 99 a reducing key for reducing the cursor and producing a pulse every time the key is pushed. Reference numeral 100 designates an inversion key of black and white; 101 a rotating key. One push of the rotating key steps the counter 60 by +1 to make a 90° rotation of the picture clockwise. FIG. 14 shows predetermined sizes S1, S2, S3 and S4 of the cursor. FIG. 15A shows a display state of the cursor S. To be more specific, the picture information read out from the first refresh memory is displayed and the cursor S corresponds to the predetermined part of the picture information. At this time, when the operator pushes the key 102 and keys in the partial display command, the partial picture information is stored in the second refresh memory 76 as described above, and is displayed as shown in FIG. 15B. FIG. 16 shows how the above operation is practically performed. In the figure, (a) indicates a cursor clock signal P, (b) a horizontal sync signal Q, (c) an output of the decoder 85, (d) an output of the decoder 86, (e) an output of the AND circuit 901, (f) an output of the T-flip-flop 87, (g) an output of the T-flip-flop 88, (h) an output of the AND circuit 902 and (i) an output of the OR circuit 89.

It should be understood that the present invention is applicable not only for the document filing system, but applicable for any type of devices requiring a picture display. Further, the present invention may of course be modified or changed within the spirit of the present invention. As described above, the present invention is provided with the picture information rotating circuit for producing the picture at a given rotating angle. The picture information outputted from the picture information rotating circuit is stored in the refresh memory and the contents of the refresh memory are displayed in the display section. Therefore, when the document is set in any direction in storing the picture information of the document, the picture information read out can always be displayed in a correct way, not inverted or brought-down way. Additionally, the picture information display device can display the picture information at any desired rotational angle.

What is claimed is:

1. A document size conversion circuit for a document filing system comprising:
    an information input terminal to which pieces of line picture information are supplied;
    a plurality of memories each adapted to store one of said pieces of line picture information supplied to the terminal;
    means for forming a matrix array of local picture information consisting of bits extracted from said plurality of memories;
    means for obtaining a picture dot position in said matrix array of local picture information, the picture dot position corresponding to a size conversion rate;
    means for obtaining an average gray level of said matrix array of local picture information with respect to said picture dot position; and
    comparator means for comparing said average gray level and a predetermined slice level to form size converted data.

2. A document size conversion circuit according to claim 1, wherein said picture dot position obtaining means includes:
    conversion rate setting data supplying means; and
    X-direction and Y-direction distance calculating means for calculating an address designating signal from said size conversion rate setting data.

3. A document size conversion circuit according to claim 2, wherein said average gray level obtaining means includes arithmetic memory means for storing a plurality of average gray level data by using said address designating signal.

4. A document size conversion circuit according to claim 1, wherein said matrix array of local picture information forming means includes a plurality of latches for latching said bits extracted from said memories.

* * * * *